United States Patent [19]

Heim

[11] Patent Number: 5,397,209

[45] Date of Patent: Mar. 14, 1995

[54] WORKPIECE-TRANSPORT TROLLEY

[76] Inventor: Otmar Heim, Gewerbestrasse 6, D-7706 Eigeltingen, Germany

[21] Appl. No.: 104,054

[22] PCT Filed: Jan. 31, 1992

[86] PCT No.: PCT/DE92/00061

§ 371 Date: Aug. 9, 1993

§ 102(e) Date: Aug. 9, 1993

[87] PCT Pub. No.: WO92/13671

PCT Pub. Date: Aug. 20, 1992

[30] Foreign Application Priority Data

Feb. 9, 1991 [DE] Germany .................. 41 03 993.9

[51] Int. Cl.⁶ .................. B23Q 7/00; B23Q 7/10; B66F 7/08

[52] U.S. Cl. .................. 414/349; 187/243; 187/269; 254/9 C; 280/43.22; 280/43.23; 280/43.24; 280/79.6; 414/495; 414/745.1

[58] Field of Search .................. 414/495, 349, 745.1; 254/8 R, 8 C, 9 R, 9 C, 122; 187/9 R, 18; 280/43.17, 43.19, 43.22, 43.23, 43.24, 79.6

[56] References Cited

U.S. PATENT DOCUMENTS

| | | | |
|---|---|---|---|
| 2,412,158 | 12/1946 | Kuehlman et al. | 414/495 |
| 2,706,102 | 4/1955 | Cresci | 254/8 C |
| 2,829,863 | 4/1958 | Gibson | 254/8 C |
| 2,833,587 | 5/1958 | Saunders | 280/43.23 X |
| 3,174,722 | 3/1965 | Alm | 187/18 X |
| 3,891,108 | 6/1975 | Traficant | 414/495 X |
| 4,744,716 | 5/1988 | Pasko et al. | 414/495 X |
| 5,105,915 | 4/1992 | Gary | 414/495 X |

FOREIGN PATENT DOCUMENTS

| | | | |
|---|---|---|---|
| 1291487 | 3/1969 | Germany | 254/122 |
| 1756778 | 4/1970 | Germany | 414/495 |
| 2241690 | 9/1991 | United Kingdom | 254/8 C |

*Primary Examiner*—David A. Bucci
*Attorney, Agent, or Firm*—Bachman & LaPointe

[57] ABSTRACT

A device for transporting workpieces to be machined and worked having a base housing or frame which may be moved on wheels and a bed which holds workpieces. The bed is connected with the base frame via a scissors mechanism and can be raised by the scissors mechanism. The scissors mechanism comprises arm braces wherein one arm brace at one end is pivotally connected to the base housing and the other arm brace on one end is pivotally connected to the bed wherein the arm braces are connected to each other at approximately the center thereof via a shaft. The wheels are mounted on the shaft which connect the arm braces and the wheels are pushed out of the base housing as the bed is lowered. The arm braces on the other end opposite the pivotal connections have a free end comprising a sliding foot which slides on the housing floor. In the resting position, the sliding foot engages under a cross rod lying above the housing floor.

10 Claims, 4 Drawing Sheets

WORKPIECE-TRANSPORT TROLLEY

FIELD OF THE INVENTION

The invention concerns a device for transporting workpieces, in particular rods, to be machined and/or worked, with a base housing or frame which may be moved on wheels, the workpieces being carried on a bed.

BACKGROUND OF THE INVENTION

Maintenance of stocks for workpieces to be machined and/or worked represents a considerable problem, in particular in large shops with a large number of machining stations. As a rule, such workpieces are located beside the processing machine in a corresponding storage bin, a desired amount of stock being maintained in this storage bin.

In many cases the processing machines stand so close together that it is not possible for ordinary transport vehicles, such as, for example, forklifts or the like, to move between the machines. For this reason the relevant workpieces still are taken to the storage bins on simple carts and the bins are then filled by hand. This is time-consuming and unsatisfactory. The task of the present invention is to develop a device of the above-mentioned type by means of which maintenance of stock may be at least partially automated.

SUMMARY OF THE INVENTION

For solving this task a bed is connected with a base housing via a scissors mechanism and may be raised via the scissors mechanism.

This has at least the consequence that the transport device no longer has to be unloaded by hand after reaching the storage bin. The workpieces are raised by the scissors mechanism and then may be put, for example, into the storage bin. If, for example, the workpieces to be transported are rod stock, preferably there are support frames on both sides which are connected with the storage bin in an appropriate way, and, for example, have a sliding slope along which the rods may slide and enter the storage bin after the bed is lowered and the rod stock is lifted out of the bed. In this way maintenance of stock at the processing machine itself is simplified significantly.

Further, it is possible to keep the transport device so narrow that even very narrow passages between the individual processing machines may be negotiated.

Of particular significance are, on the one hand, the maneuverability of the transport device and, on the other hand, its stability during unloading. In accordance with the invention both problems are solved by providing wheels which, on the one hand, provide a very good radius of turn, but which, on the other hand, may be raised when reaching the unloading position, so that the base housing rests on the floor. These corresponding features of the device will be described further below.

In the present specific embodiment the scissors mechanism consists of arm braces which cross at a pivot. In this case one end of one arm brace is connected with the base housing via a pivot, while the other arm brace with one of its ends has a pivot with the bed. The free ends of the arm braces, on the other hand, are made so they may slide. One arm brace, which has a hinged connection with the bed, on the other end forms a sliding foot which slides on a housing floor during the scissors motion. The free end of the other arm brace, on the other hand, slides in a corresponding guide groove in the bed resp. a frame of the bed. No limit is to be set on the inventive imagination here.

It is important that the end of an arm brace, made as a sliding foot, clamp under a cross rod in the housing when the resting position of the scissors mechanism is reached, i.e. when the bed is lowered, so that the wheels, which preferably are located on the shaft which also connects the arm braces with one another, may be pushed out of the base housing. However, this means, vice versa, that when the bed is lifted the wheels are retracted, and, the base housing is set down.

Moreover, at least two pairs of arm braces parallel to one another, connected together via the shaft, are preferred.

Also, maneuverability of the device is provided with a swiveling front wheel, in the specific embodiment under consideration a swiveling front wheel of this type being provided on each side of the base housing. So that this front wheel is raised when the bed is raised, and thus the base housing is lowered, in accordance with the invention it should rest on a bell-crank lever which is connected via a chain or the like with a further bell crank lever within the base housing. Instead of the chain, of course, other connecting elements may be used. The bell-crank levers are arranged with respect to each other so that when the bed is lowered the bell-crank lever within the housing is engaged by the scissors mechanism and turned so that a tension is exerted on the chain and also the bell-crank lever outside, on which the front wheel is located, is turned around a corresponding pivot.

In this way the front wheel is brought into the appropriate moving position. The front wheels also may be rotated completely around their vertical axis on the bell-crank levers so that in this way, for example, the device may be turned around itself. Thus, the device is extremely maneuverable.

Also, the arm braces and the scissors mechanism preferably is moved by means of a hydraulic cylinder, which engages at least one arm brace via a corresponding piston rod. The device is provided with corresponding supply lines for the hydraulics as well as motors for driving the wheels, so that the entire device also may be made self-propelled.

At least one support frame, but preferably frames on both sides, over which the rods may slide into a storage bin, are aligned with a device of the type invented for unloading the transported material. This means that the device is moved beside a storage bin for the rods and then the rods are lifted to approximately the height of the filling opening of the storage bin. Then the support frames are placed under the rods and the scissors mechanism is lowered again. Then the rods remain on the support frames and slide along these into the storage bin.

In order that the rods do not drop into the storage bin in a disorderly fashion and thus cause considerable noise, further, in accordance with the invention it is provided that a cable or the like be located between side posts of the storage bin. This cable is fastened to a side post, while it is laid over a pulley on or near the opposite post. The free end of the cable then is loaded with a counterweight. Of course, it may also suffice that the cable only be guided over an edge of the opposite side post.

The weight is determined so that it gives way to a corresponding pressure of a corresponding number of rods so that they are lowered in the course of time. On the one hand this results in an orderly placing of the rods, and, on the other hand, no noise is caused.

Further advantages, features, and peculiarities of the invention are given in the following description of preferred specific embodiments as well as by means of the drawing; here

DETAILED DESCRIPTION OF THE PREFERRED EMBODIMENT

Figure 1:
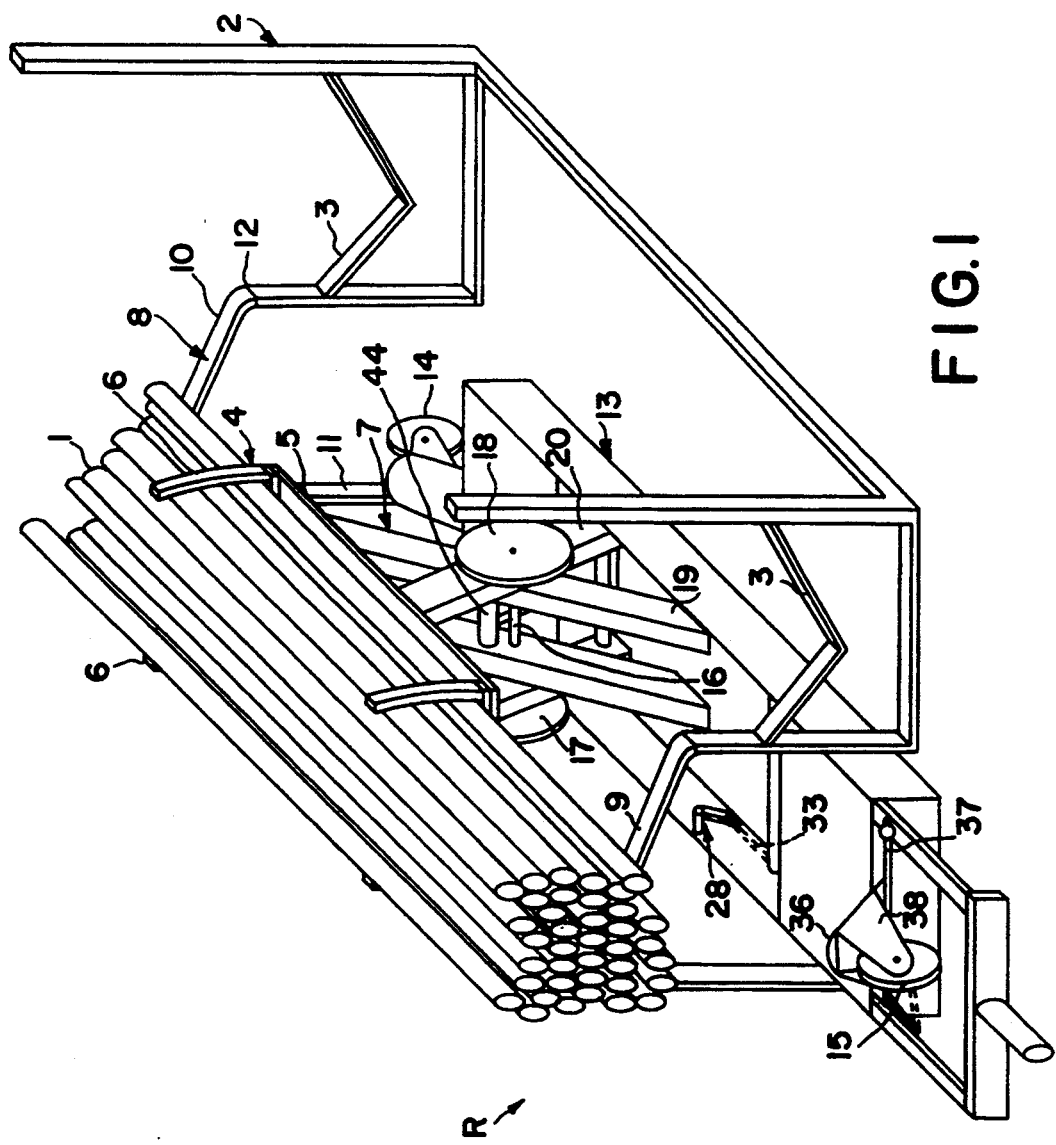
FIG. 1 shows a perspective view of a device in accordance with the invention for transporting rod stock in an unloading position.

A device R, in accordance with the invention, for transporting in particular rods 1 to be further processed, which device stands beside a storage bin 2 as shown in FIG. 1. The rods 1 are to be loaded into this storage bin 2, resting on cross-braces 3 after the unloading of the device R.

Another possibility in accordance with the invention consists in stretching a cable or the like across from one post of the storage bin 2 to the other, the cable being attached to one post while on the other post it runs over a pulley or the like and then a weight is fastened to it. This prevents the rods from lying crosswise during or after the filling of the storage bin.

The rods 1 for transporting lie in a bed 4 which essentially consists of an approximately rectangular frame 5 and side braces projecting therefrom.

This bed 4 rests on a scissors mechanism 7 and may be raised or lowered by means of the scissors mechanism 7. In FIG. 1 the bed 4 is shown in the raised end position. For unloading, one of the support frames 8 and 9 is placed on each side under the rods, each support frame consisting of a sliding slope 10 and a supporting leg 11. In the operating position one end of the sliding slope 10 is inserted into a corresponding holding opening 12 of the storage bin 2. If the bed 4 now is lowered by means of the scissors mechanism 7, the rods 1 may slide on the sliding slope 10 into the storage bin 2 and rest there on the cross braces 3.

During the unloading procedure a base housing 13 of the device R rests on a shop floor or the like so that the device R is given a stable base. However, after the unloading, two front wheels 14 and 15 (see, in particular, FIG. 2) and two side wheels 17 and 18, connected together by means of a shaft 16 are brought into a traveling position. This takes place by means of the following measures:

The scissors mechanism 7 consists of two pairs of crossing arm braces 19 and 20. These arm braces are connected together by means of a shaft 16 so that the shaft 16 also forms a pivot for the swivel mechanism 7.

Further, the two arm braces 20 arranged parallel to one another are connected together at one end in the housing by means of a pivot 21. The end 22 of each arm brace 20 lying opposite the pivot 21 on the other hand slides freely in a guide channel 54 of the frame 5, which is not shown in greater detail. For example, the frame 5 may be made as a U-section so that the two side arms of the "U" receive the end 22 of the arm braces. The arm brace 20 then is supported against the bottom of the section.

The arm braces 19, on the other hand, have a pivot 23 with the frame 5 of the bed 4, while the opposite end of this arm brace 19 is made as a sliding foot 24. This sliding foot 24 slides in the direction y on a housing bottom 25 with the scissors mechanism 7 opened, i.e. when the bed floor is raised in the direction x. When the bed 4 is lowered, the sliding foot slides in the direction y, and thus engages under a cross rod 26 which forms a support. The scissors mechanism 7 now may be closed further, the side wheels 17 and 18 emerging through an opening 27 in the housing bottom 25 and thus raise the base housing 13.

The front wheels 14 and 15 are lowered into the moving position also as a result of the lowering motion of the scissors mechanism 7. During the lowering the arm braces 19 and 20 strike bell-crank levers 28 located on both sides of the axle 16. Each of these bell-crank levers 28 has a pivot 29 mounted on the housing, this pivot 29 being located between a pressure lever 30 and a pull lever 31. If one arm brace 19 and 20 in the given case pushes on the pressure lever 30 via a stop piece 32, the bell-crank lever 28 turns around the pivot 29, the pull lever 31 pulling on a chain 33. This chain 33 is connected outside of the base housing 13 with a pull lever 34 of the further bell-crank lever 35, which again has a pivot 37 between the pull lever 34 and the pressure lever 36.

The front wheel 14 and 15 is mounted on the pull lever 36, being connected with the pressure lever 36 via a corresponding fastening bracket 38 respectively turning with respect to the pressure lever 36 around a pivot 39, which is indicated only with a dashed line. The entire device R is steered by this turning around the pivot 39.

By means of this simple, but effective, configuration, the movement of the scissors mechanism 7 causes both the side wheels 17 and 18, as well as the front wheels 14 and 15, to be lowered into a moving position.

The scissors movement is produced by means of a hydraulic cylinder 40. This hydraulic cylinder 40 has a pivot 41 attached to the housing, in the specific embodiment shown the cylinder 42 itself being connected with this pivot 41. A piston rod 43, which emerges from the cylinder 42, is connected with the two braces 19 running parallel between the axle 16 and the pivot 23, a pivot 44, which is only indicated, being provided for this. If the piston rod 43 is pushed out of the cylinder 42, the sliding foot 24 slides on the housing bottom 25 in the direction y. In this way the scissors mechanism 7 expands and the bed 4 is raised in the x direction. It is lowered in the opposite direction.

A power supply for the hydraulic cylinder 40, not shown in more detail, is located in a housing box 45. Further, this also holds an electric motor, by which the side wheels 17 and 18 may be driven. For this, corresponding drive elements and connecting chains are provided between the electric motor and the axis 16, which are ignored in the preceding specific embodiment for the sake of simplicity.

Batteries 46, which are provided in a forward housing box 47, serve for the power supply of the electric motor as well as the hydraulic mechanism.

Figure 2:
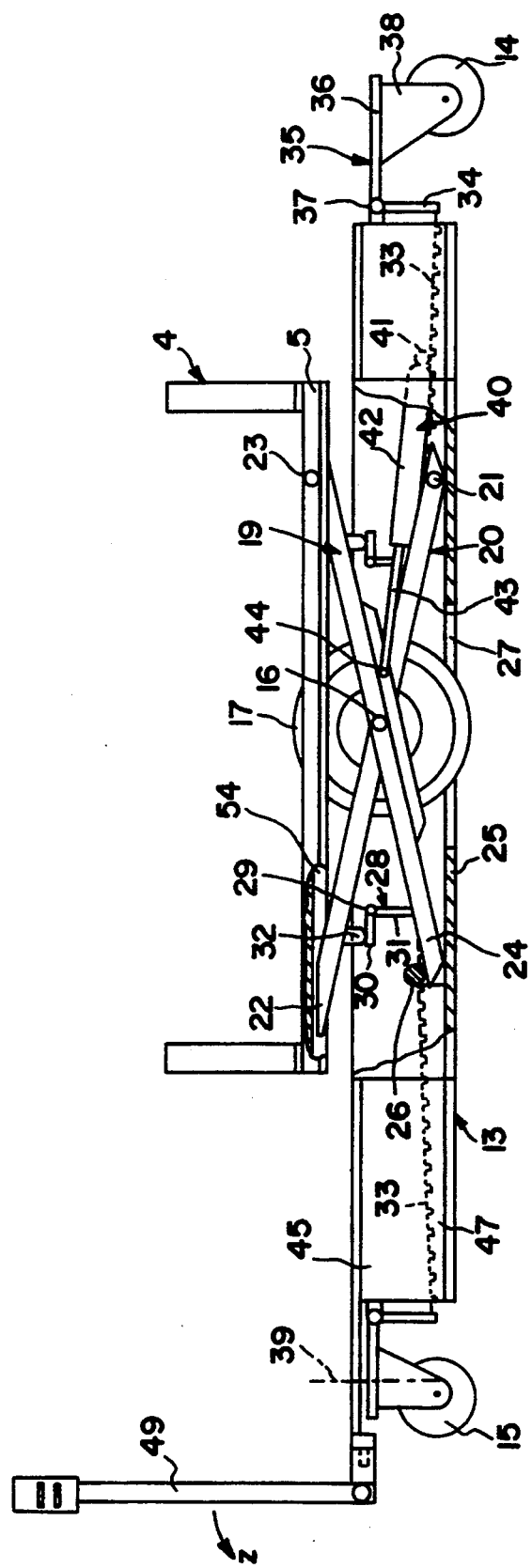
FIG. 2 shows a partially cut away side view of the device invented in accordance with FIG. 1 in a further operating position.
Figure 3:
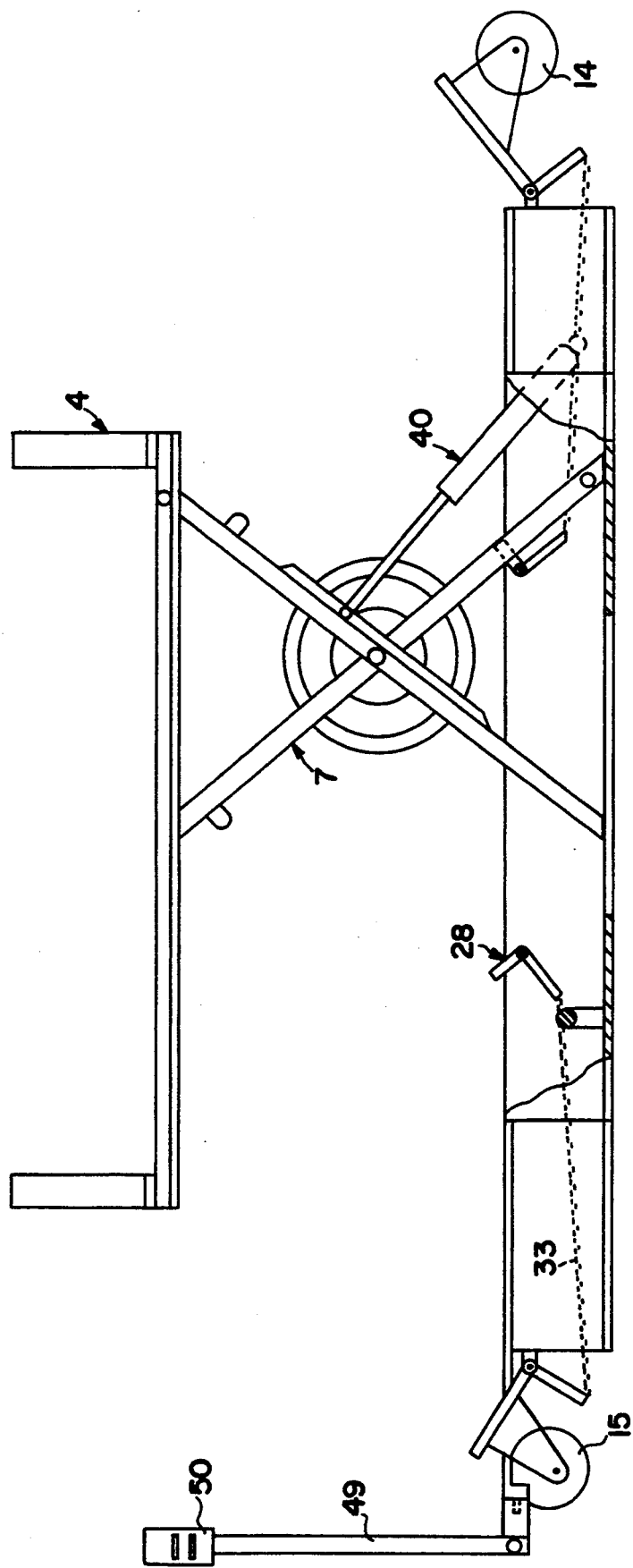
FIG. 3 shows a partially cut away side view of the device in accordance with FIG. 1 in a further operating position.
Figure 4:
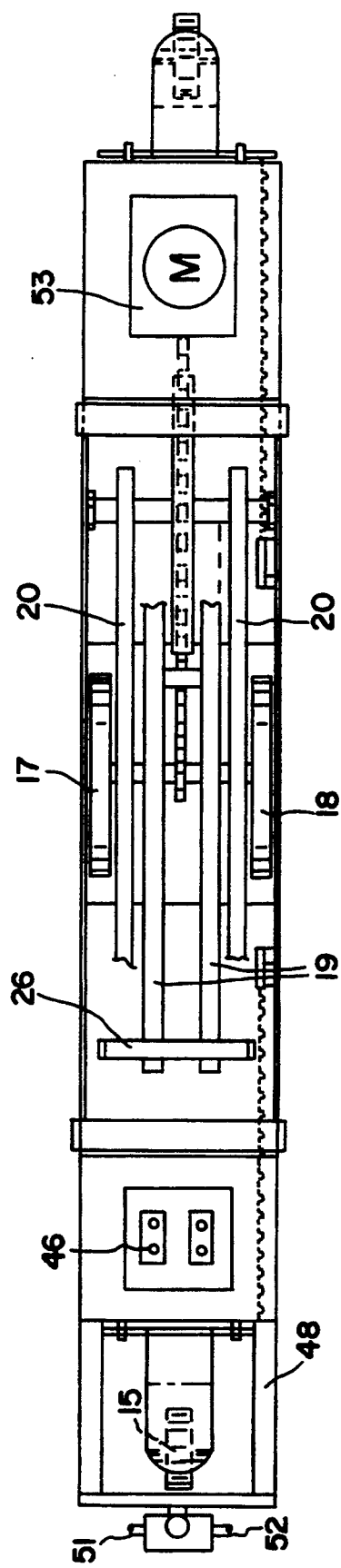
FIG. 4 shows a top view of the device in accordance with FIG. 1.

Further, in FIG. 4 it may be seen that a draw bar frame 48 is associated with the front wheel 15, from which frame a draw bar 49 projects in accordance with FIGS. 2 and 3. This draw bar 49 ends in a switch box 50, which has lever switches 51 and 52 on both sides. A drive motor 53, indicated only schematically, that is, the above-mentioned electric motor, is operated via these lever switches 51 and 52, while the other lever switch operates the hydraulic supply. The draw bar 49 also is hinged with the draw bar frame so that the draw bar 49 may be moved in the z direction. For moving this draw bar 49 is pulled, the front wheels 14 and 15 making it possible to turn curves.

| POSITION NUMBER LIST | |
|---|---|
| 1 Rods | 31 Towing Angle |
| 2 Storage Rack | 32 Stop |
| 3 Cross Brace | 33 Chain |
| 4 Bed | 34 Pull |
| 5 Frame | 35 Bell-Crank Lever |
| 6 Side Brace | 36 Pressure Lever |
| 7 Scissors Mechanism | 37 Pivot |
| 8 Supporting Frame | 38 Fastening Bracket |
| 9 Supporting Frame | 39 Pivot |
| 10 Sliding Slope | 40 Hydraulic Cylinder |
| 11 Supporting leg | 41 Point of Rotation |
| 12 Opening | 42 Cylinder |
| 13 Base Housing | 43 Piston Rod |
| 14 Front Wheels | 44 Pivot |
| 15 Front Wheels | 45 Housing Box |
| 16 Axle | 46 Battery |
| 17 Side Wheels | 47 Housing Box |
| 18 Side Wheels | 48 Draw Bar Frame |
| 19 Arm Brace | 49 Draw Bar |
| 20 Arm Brace | 50 Switch Box |
| 21 Pivot | 51 Lever Switch |
| 22 End of 20 | 52 Lever Switch |
| 23 Pivot | 53 Drive Motor |
| 24 Sliding Foot | R Device |
| 25 Housing Bottom | X Lifting Direction |
| 26 Cross Rod | Y Sliding Direction |
| 27 Opening | Z Direction |
| 28 Bell-Crank Lever | |
| 29 Pivot | |
| 30 Pressure Lever | |

What is claimed is:

1. A device for transporting workpieces, comprising: a base housing having wheels; a bed for receiving workpieces attached to the base housing via a scissors mechanism, wherein the scissors mechanism is adapted to raise the bed, the scissors mechanism comprising a first and second arm brace, wherein the first arm brace is pivotally attached at a first end to the base housing and the second arm brace is pivotally attached at a first end to the bed and the arm braces are connected via a shaft, wherein a set of the wheels are mounted on the shaft and upon raising the bed, the set of wheels are raised such that the base housing is caused to rest on a support surface.

2. The device according to claim 1, wherein the first arm brace has a sliding foot on a free end thereof adapted to slide on the bed and the second arm brace has a sliding foot on a free end thereof adapted to slide on the base housing.

3. The device according to claim 2, further comprising a rod extending above and across the base housing adapted to engage the sliding foot of the second arm brace.

4. The device according to claim 2, wherein the sliding foot of the first arm brace is adapted to slide in a guide channel located in the bed.

5. The device according to claim 1, wherein the scissors mechanism includes a lower portion adapted to engage a first bell-crank lever which is connected to the base housing, upon lowering of the scissors mechanism and the base housing is provided with at least one swiveling front wheel resting on a second bell-crank lever, wherein the first and second bell-crank levers are connected by a chain.

6. The device according to claim 5, wherein the first bell-crank lever is pivotally engaged with the base housing and comprised of a first pressure lever adapted to engage with the scissors mechanism and a first pull lever, wherein upon the lowering of the scissors mechanism, the first pressure lever causes the first bell-crank lever to pivot on the base housing and causes the first pull lever to pull on the chain.

7. The device according to claim 6, wherein the second bell-crank lever comprises a second pull lever and a second pressure lever connected with the wheel, wherein upon the actuation of the second pull lever, the second pull lever pivots the second bell-crank lever and drives the second pressure lever and the front wheel.

8. The device according to claim 1, further comprising a hydraulic cylinder for moving the scissors mechanism which is connected to at least one of the first and second arm braces, wherein the hydraulic cylinder includes a piston rod which is pivotally connected with the at least one arm brace and the cylinder is pivotally connected with the base housing.

9. The device according to claim 1, further comprising a motor for driving at least the set of wheels and a hydraulic supply for driving the hydraulic cylinder.

10. The device according to claim 1, further comprising a storage rack and a support frame extending from the bed, wherein the support frame is adapted to be received into the storage rack.

* * * * *